United States Patent
Jonas et al.

(10) Patent No.: US 6,737,162 B2
(45) Date of Patent: May 18, 2004

(54) TRANSPARENT PLASTICS MOLDING COMPOSITION

(75) Inventors: Friedrich Jonas, Aachen (DE); Peter Bier, Krefeld (DE); Mark Peters, Walled Lake, MI (US)

(73) Assignee: Bayer Aktiengesellschaft, Leverkusen (DE)

( * ) Notice: Subject to any disclaimer, the term of this patent is extended or adjusted under 35 U.S.C. 154(b) by 31 days.

(21) Appl. No.: 10/039,267

(22) Filed: Jan. 4, 2002

(65) Prior Publication Data

US 2002/0155296 A1 Oct. 24, 2002

(30) Foreign Application Priority Data

Jan. 8, 2001 (DE) .......................................... 101 00 442

(51) Int. Cl.$^7$ ............................................... B32B 27/38
(52) U.S. Cl. ....................... 428/413; 428/414; 428/419; 428/522; 428/520; 428/447
(58) Field of Search ................................ 428/412, 413, 428/414, 419, 522, 520, 447

(56) References Cited

U.S. PATENT DOCUMENTS

| | | | |
|---|---|---|---|
| 4,242,383 A | 12/1980 | Goossens et al. | 427/387 |
| 6,096,491 A | 8/2000 | Majumdar et al. | 430/529 |
| 6,172,812 B1 * | 1/2001 | Haaland et al. | 359/589 |
| 2002/0077450 A1 * | 6/2002 | Kirchmeyer et al. | 528/373 |
| 2003/0055130 A1 * | 3/2003 | Groenendaal et al. | 523/161 |

FOREIGN PATENT DOCUMENTS

| | | |
|---|---|---|
| DE | 42 27 757 | 2/1974 |
| DE | 41 29 282 A1 | 3/1993 |
| EP | 1 031 413 A2 | 8/2000 |

* cited by examiner

*Primary Examiner*—D. Lawrence Tarazano
(74) *Attorney, Agent, or Firm*—Joseph C. Gil; Aron Preis

(57) ABSTRACT

Transparent moldings comprising a polymeric base material and at least one coating formed thereon is disclosed. The coating includes a primer coat that containing an epoxy and/or acrylic resin is disposed on at least one surface of the base material, a heat-absorbing coating which contains a polythiophene compound and a scratch-resistant coating. In an additional embodiment of the invention, the coating contains no primer and the heat absorbing coating contains a polythiophene compound.

25 Claims, No Drawings

TRANSPARENT PLASTICS MOLDING COMPOSITION

FIELD OF THE INVENTION

The invention concerns a transparent plastics molding and more particularly a molding carrying a heat absorbing coating and a scratch-resistant coating.

SUMMARY OF THE INVENTION

Transparent moldings comprising a polymeric base material and at least one coating formed thereon is disclosed. The coating includes a primer coat that containing an epoxy and/or acrylic resin is disposed on at least one surface of the base material, a heat-absorbing coating which contains a polythiophene compound and a scratch-resistant coating. In an additional embodiment of the invention, the coating contains no primer and the heat absorbing coating contains a polythiophene compound.

BACKGROUND OF THE INVENTION

It is known that coatings which absorb infrared light can be used to reduce the heat-up of plastics and composite glass sheets or panes by solar radiation. Thin coatings of polythiophene or of soluble polythiophene salts have proved particularly effective in this regard.

In order to produce light-absorbing composite glass sheets such as these, aqueous/alcoholic solutions of polythiophenes, mostly in admixture with a silane-based bonding agent, are deposited on a transparent glass sheet and the solvent is evaporated at room temperature. The dry thickness of the coating is about 0.2 μm. To produce a composite glass sheet, the glass sheet is pressed with a polyvinylbutyral film and a further glass sheet at 145° C./10 bar. Heat-absorbing composite glass sheets are known from DE 42 26 757 A1, for instance.

Moreover, DE 41 29 282 A1 discloses that transparent plastics sheets of polycarbonate or polymethyl methacrylate can be coated with polythiophenes for thermal insulation, and can optionally be provided with an acrylate- or polyurethane-based protective coating. This specification gives an example of a polycarbonate to which a solvent-containing primer based on polyvinyl acetate is first applied, followed by drying of the primer and the application of a solvent-containing coating of 3,4-ethylene dioxythiophene and volatilization of the solvent. The polycarbonate film which is coated in this manner exhibits infrared-absorbing properties.

Whilst the production of heat-absorbing composite glass sheets described above has become a process which is commonly used in industry, the corresponding coating of plastics glass sheets has proved to be extraordinarily difficult in practice. In particular, the known substances for the formation of infrared absorbing coatings, such as the material which is marketed for this purpose by Bayer AG under the trade name Baytron®, cannot be satisfactorily applied on plastics as they can on glass. Both the wetting of the plastics surface by the latter material and the adhesion thereof to the plastics surface are poor, and give unsatisfactory results. Even the polyvinyl acetate-based primer which is described in DE 41 29 282 A1 and which is disposed between a plastics sheet and a polythiophene coating has proved to be unsatisfactory for ensuring uniform wetting and durable bonding of the polythiophene compound to the plastics surface.

The underlying object of the present invention is thus to provide forms of application for known substances which absorb infrared light on plastics such as polycarbonates and poly(meth)acrylates.

DETAILED DESCRIPTION OF THE INVENTION

This object is achieved according to the invention by a transparent plastics molding comprising a polymeric base material (B) and at least one coating which is formed thereon, wherein a primer coat (G) containing an epoxy and/or acrylic resin is disposed on at least one side of the base material (B), on the surface of which primer coat a heat-absorbing coating (Z) is disposed which contains a polythiophene compound, and a scratch-resistant coating (K) is formed over the intermediate coating (Z).

This object is also achieved according to the invention by a transparent plastics molding comprising a polymeric base material (B) and at least one coating formed thereon, characterized in that a heat-absorbing coating (W), which is obtainable by hardening an aqueous dispersion containing an epoxy and/or acrylic resin and a polythiophene compound, is disposed on at least one side of the base material (B), and a scratch-resistant coating (K) is formed over the heat-absorbing coating (W).

Attempts were made to apply Baytron coatings to polycarbonates, using very different primer and outer coatings. However, it became clear that the UV stability and thermal stability of Baytron were unsatisfactory with regard to the aforementioned problems.

It has now been ascertained that heat-absorbing polythiophene compounds can be bonded surprisingly well into acrylic and/or epoxy resin-based systems, and exhibit excellent compatibility therewith. It has also been ascertained that certain scratch-resistant coatings (K), particularly those based on silanes containing polysiloxanes and epoxide groups, are particularly suitable in combination with polythiophene compounds.

In principle, the plastics molding according to the invention may comprise two different types of coating structure. In a first embodiment of the invention, an acrylic and/or epoxy resin-based primer coat (G) is first applied to a plastics substrate (B) and is hardened. Water-based acrylic or epoxy resin systems, i.e. those with little or no solvent content, are preferred in this respect. A heat-absorbing intermediate coating (Z) which contains a polythiophene compound is then applied to said primer coat (G). This coating composition is also present in the form of an aqueous system, i.e. it has little or no solvent content. After drying, a scratch-resistant coating (K) is applied to the heat-absorbing intermediate coating (Z), and protects the underlying coatings, particularly the intermediate coating (Z) which contains the sensitive polythiophene compound, from mechanical damage and UV radiation.

The molding according to the invention which comprises the coating structure described above is distinguished by uniform wettability of the primer coat (G) by the coating composition for the intermediate coating (Z), which contains a polythiophene compound. It is also distinguished by the outstanding adherence of the individual coatings to each other and by its excellent heat-absorbing properties as measured by TSET (Total Solar Energy Transmission).

According to a second embodiment of the invention, the heat-absorbing coating (W) which contains a polythiophene compound is applied directly, i.e. without a prior primer coat, to the plastics substrate (B). For this purpose, a coating composition which contains an epoxy and/or acrylic resin and a polythiophene compound is applied to the plastics substrate (B) and hardened. It is important here that the coating composition is applied as an aqueous system, e.g. as an aqueous dispersion, since it is only in this manner that a uniform distribution of the polythiophene compound in the acrylic or epoxy resin, as well as good wettability, may be attained. The aqueous dispersion should therefore contain as little solvent as possible, preferably none at all. A scratch-resistant coating (K) is subsequently applied to the heat-absorbing coating (W) which is applied and hardened in this manner, in order to protect the underlying coating from mechanical damage and UV radiation.

The molding according to the invention which comprises the coating structure described above is distinguished by outstanding bonding between the plastics substrate (B) and the heat-absorbing coating (W), by a uniform distribution of the polythiophene compound in the heat-absorbing coating (W), and by its outstanding heat-absorbing properties as measured by TSET (Total Solar Energy Transmission).

The individual components which are suitable for producing moldings according to the invention are described in detail below:

Polymeric Base Material (B)

Substances which are particularly suitable as the polymeric base material (B) are thermoplastic materials such as those which are described, for example, in Becker/Braun, Kunststofftaschenbuch, Carl Hanser Verlag, Munich, Vienna, 1992.

A polymeric multi-layer material, e.g. a double-layer body which may be obtained by coextrusion, is particularly suitable as the base material (B).

Transparent thermoplastics are particularly suitable, e.g. those based on polycarbonates, polyester carbonates and/or polymethacrylates. Examples of polycarbonates which are particularly suitable include bisphenol A homopolycarbonate, and copolycarbonates based on bisphenol A and 1,1-bis-(4-hydroxyphenyl)-3,3,5-trimethyl-cyclohexane).

The polymeric base material may exist in the form of sheets, spectacles, optical lenses, automobile window glass and plastics lens covers, for example.

Polycarbonates in the sense of the present invention include both homopolycarbonates and copolycarbonates. The polycarbonates may be linear or branched, in the known manner.

Part of the carbonate groups in the polycarbonates, namely up to 80 mol %, preferably from 20 mol % up to 50 mol %, may be replaced by aromatic dicarboxylic acid ester groups. Polycarbonates of this type, which contain both acid residues of carbonic acid and acid residues of aromatic dicarboxylic acids incorporated in their molecular chain, are polyester carbonates. In the sense of the present invention, these are included under the general term "polycarbonates".

Polycarbonates may be produced by known methods. Examples of suitable methods for the production of polycarbonates include the production thereof from bis-phenols and phosgene by the phase boundary method or from bisphenols and phosgene by the homogeneous phase method, which is termed the pyridine method, or from bisphenols and esters of carboxylic acids by the melt esterification method. These methods of production are described, for example, by H. Schnell in "Chemistry and Physics of Polycarbonates", Polymer Reviews, Volume 9, pages 31 to 76, Interscience Publishers, New York, London, Sidney, 1964. The aforementioned methods of production are also described by D. Freitag, U. Grigo, P. R. Müller and H. Nouvertne in "Polycarbonates" in the Encyclopedia of Polymer Science and Engineering, Volume 11, Second Edition, 1988, pages 648 to 718, and by U. Grigo, K. Kircher and P. R. Müller in "Polycarbonate" in Becker, Braun, Kunststoff-Handbuch, Volume 3/1, Polycarbonates, Polyacetals, Polyesters, Cellulose Esters, Carl Hanser Verlag, Munich, Vienna 1992, pages 117 to 299.

The melt transesterification method is described in particular by H. Schnell in "Chemistry and Physics of Polycarbonates", Polymer Reviews, Volume 9, pages 44 to 51, Interscience Publishers, New York, London, Sidney, 1964, and is also described in DE 1 031 512 A, U.S. Pat. Nos. 3,022,272, 5,340,905 and 5,399,659.

The polycarbonates preferably have weight average molecular weights ($M_w$)(as determined by measuring the relative viscosity at 25° C. in $CH_2Cl_2$ at a concentration of 0.5 g per 100 ml $CH_2Cl_2$) of 12,000 to 400,000 g/mol, more preferably from 18,000 to 80,000 g/mol, and most preferably from 22,000 to 60,000 g/mol.

IR-absorbing Polythiophenes

Substances which are suitable for infrared absorption according to the invention include, amongst others, the polythiophenes which are known from DE 38 13 589 A1, of general formula

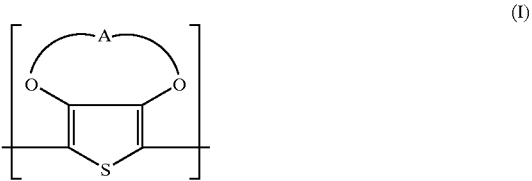

(I)

wherein A represents a $C_1$–$C_4$ alkylene radical which is optionally substituted.

Particularly suitable polythiophenes of general formula (I) are those in which A denotes a methylene group which is optionally substituted by alkyl groups or an ethylene-1,2 radical which is optionally substituted by $C_1$ to $C_{12}$ alkyl groups or by phenyl groups, or a cyclohexylene-1,2 radical, particularly a methylene-ethylene-1,2- or propylene-1,2 radical.

Other compounds which are suitable according to the invention are the soluble salts of polythiophenes which are known from EP 0 440 957 A2 and which are built up from structural units of formula

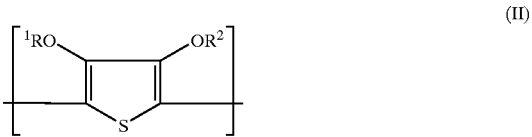

(II)

wherein $R^1$ and $R^2$, independently of each other, denote hydrogen or a $C_1$ to $C_4$ alkyl group and together denote a $C_1$ to $C_4$ alkylene radical which is optionally substituted.

Particularly suitable polythiophenes comprising structural units of general formula (II) are those in which $R^1$ and $R^2$, independently of each other, represent hydrogen or methyl, or together represent a methylene radical which is optionally alkyl-substituted, an ethylene-1,2 radical which is optionally substituted by a $C_1$ to $C_{12}$ alkyl group or by phenyl, or a cyclohexylene-1,2 radical. 3,4-ethylene dioxythiophene is a most particularly suitable polythiophene compound.

The polythiophene compound is preferably used in the form of an aqueous dispersion, particularly as an aqueous dispersion of polyethylene dioxythiophene (PEDT). Suitable polymers such as polystyrene sulphonate (PSS) may be added in suitable amounts thereto. Dispersions of this type are commercially available under the trademark "Baytron®-P" of Bayer AG.

As regards other advantageous examples of polythiophene compounds which may be used according to the invention, and the production and characterization thereof, reference is made to DE 38 13 589 A1 and EP 0 440 957 A2, the disclosures of which are expressly referred to here.

Heat-absorbing Intermediate Coating (Z)

The heat-absorbing intermediate coating (Z) is formed by the application and drying of a coating solution or composition containing at least one polythiophene compound of the type described above. Coating solutions and compositions of this type, and the production of coatings therefrom, are described in detail in DE 38 13 589 A1 and in EP 0 440 957 A2, for example.

The heat-absorbing intermediate coatings (Z) which are particularly preferred are those which may be obtained by the application and drying of an aqueous dispersion of polyethylene dioxythiophene (PEDT), particularly in combination with a suitable polymer such as polystyrene sulphonate (PSS). Coating dispersions of this type are commercially available under the trademark "Baytron®-P" of Bayer AG.

The heat-absorbing intermediate coating (Z) generally has a coating thickness of 0.01 to 1.5 μm, preferably 0.05 to 0.5 μm.

Primer Coat (G)

The primer coat (G) which is used according to the invention contains a hardened epoxy and/or acrylic resin. It preferably has a coating thickness of less than 50 μm, more preferably less than 15 μm, most preferably less than 1 μm.

One preferred primer coat (G) may be obtained by the crosslinking of multi-epoxyfunctional compounds, hereinafter called epoxy compounds, with what are termed hardeners, which are also called hardening agents or crosslinking agents.

These multi-epoxyfunctional compounds and hardeners, as well as the production and use thereof, are described, for example, in: the Kunststoff-Handbuch, Volume 10. "Thermosetting plastics", edited by Prof Dr. Wilbrand Woebcken, Carl Hanser Verlag, 1988, and in the Kunststoff-Handbuch Volume XI, Polyacetals, Epoxy Resins, Fluorine-Containing Polymers, Silicones, etc., edited by Prof. Vieweg, Dr. Reiher and Dr. Scheurlen, Carl Hanser Verlag, Munich, 1971, and in Epoxy Resins, Chemistry and Technology, edited by Clayton A. May and Yoshio Tanaka, Marcel Dekker Inc., New York, 1973, all incorporated by reference herein.

Epoxy compounds may be produced by known methods, such as those described below. They are generally produced by the reaction of epichlorohydrin with substances which contain an active hydrogen atom, according to the following reaction scheme:

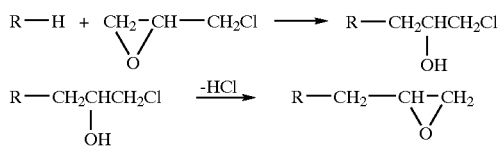

or by the direct epoxidation of olefins by peracids:

Details of methods of production, with references to the original literature, may be found in the Encyclopedia of Polymer Science and Engineering, 2nd Edition, Volume 6, pages 322 to 382, John Wiley & Sons, or in the Encyclopedia of Chemical Technology, Fourth Edition, Volume 9, pages 730 to 755, or in Ullmanns Enzyklopädie der technischen Chemie, Third Edition, 8th Volume, pages 431 to 437, Urbane & Schwarzenberg, Munich-Berlin, or in Ullmanns Encyclopedia of Industrial Chemistry, Fifth Edition, Volume A9, pages 531 to 563, VCH Verlagsgesellschaft mbH, D-6940 Weinheim.

Aromatic glycidyl compounds may be used as epoxy compounds.

Examples thereof include:

bisphenol A diglycidyl ethers of the following formula

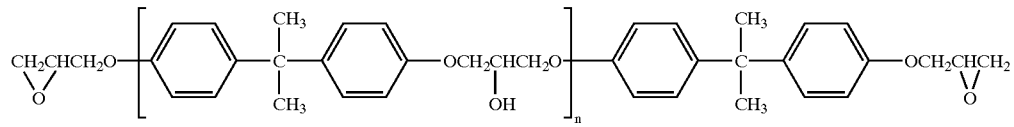

wherein n=0 for the pure product, n=0 to 15 for the industrial product, and n=approx. 2 or approx. 4 or approx. 12 for what are termed technical advancement products;

tetrabromo-bisphenol A-diglycidyl ether (bromine content of the industrial product approx. 47 to 50% by weight) of the following formula

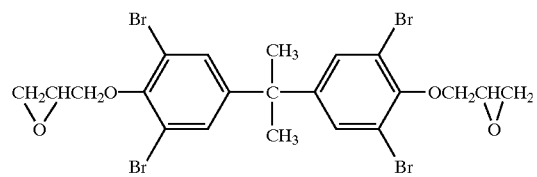

phenol novolac glycidyl ethers which correspond substantially to the formula

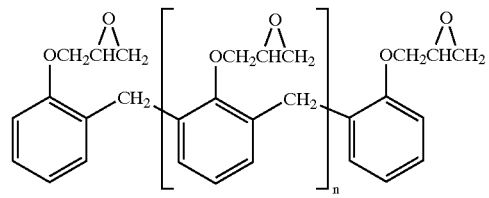

wherein n is between 0.2 and 1.4 in industrial products, cresol novolac glycidyl ethers, which correspond substantially to the following formula

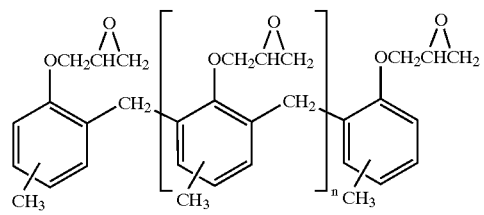

wherein n is between 1.0 and 4.0 in industrial products, bisphenol-F-diglycidyl ethers (sold as a mixture of isomers) which comprise the following constituents

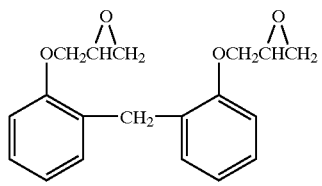

(10 to 15% by weight)

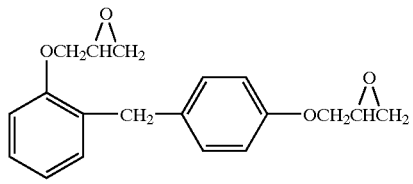

(50 to 55% by weight)

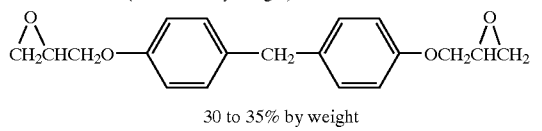

30 to 35% by weight wherein the sum of the above constituents is 100% by weight;

glyoxal tetraphenol tetraglycidyl ethers of the following idealized formula (by-products are contained therein),

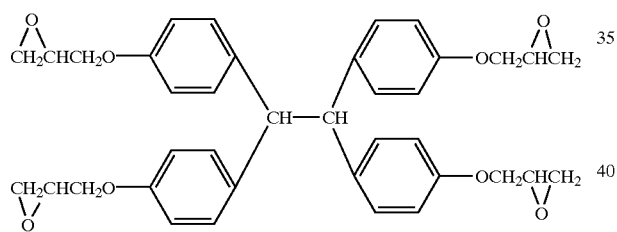

N,N-diglycidylaniline of the following formula

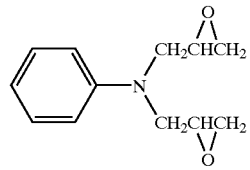

p-aminophenol triglyceride of the following formula

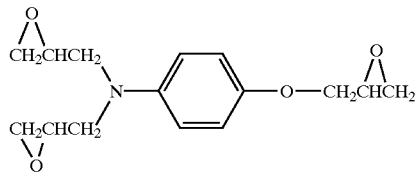

4,4'-diaminodiphenylmethanetetraglyceride of the following formula

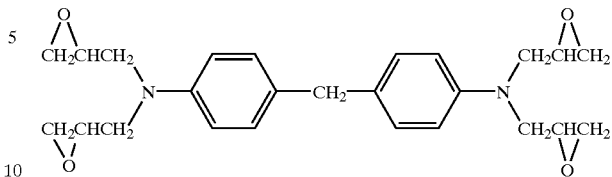

Cycloaliphatic glycidyl compounds may also be used as epoxy compounds. Examples thereof include:

tetrahydrophthalic acid diglycidyl esters of the following formula

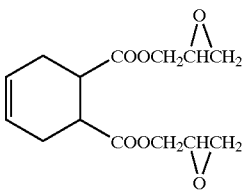

hexahydrophthalic acid diglycidyl esters of the following formula

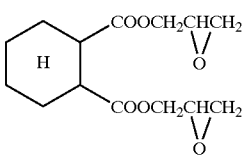

hydrogenated bisphenol A-diglycidyl ethers of the following formula

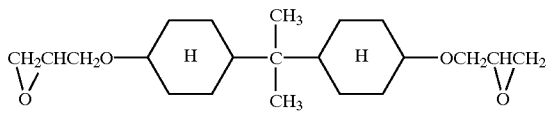

Heterocyclic glycidyl compounds may also be used as epoxy compounds. Examples thereof include:

triglycidyl isocyanurate of the following formula

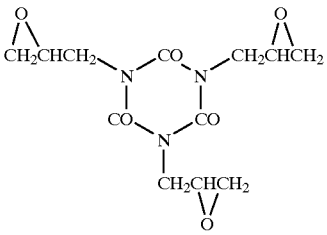

triglycidyl-bis-hydantoin of the following formula

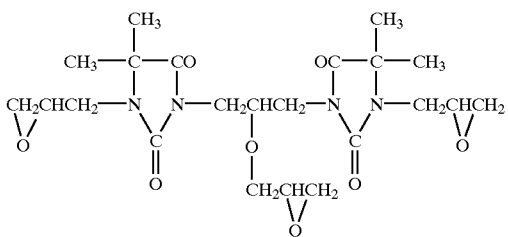

Cycloaliphatic epoxy compounds which may be employed as starting materials for cycloaliphatic epoxy resins may also be used as epoxy compounds. Examples thereof include:

3,4-epoxycyclohexane-carboxylic acid-3,4'-epoxycyclohexylmethyl esters of the following formula

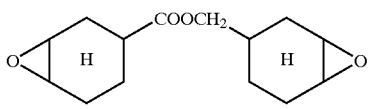

bis-(3,4-epoxycyclohexylmethyl) adipate of the following formula

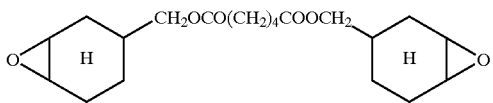

3-(3,4'-epoxycyclohexyl)-2,4-dioxaspiro[5,5]-8,9-epoxyundecane of the following formula

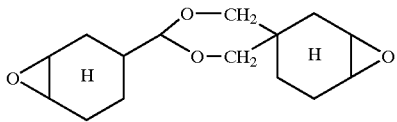

Aliphatic epoxy compounds which may be employed as starting materials for aliphatic epoxy resins may also be used as epoxy compounds. Examples thereof include:

butane-1,4-diol diglycidyl ethers of the following formula

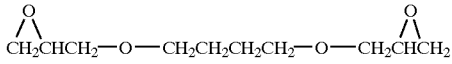

polypropylene glycol-425-diglycidyl ethers of the following formula

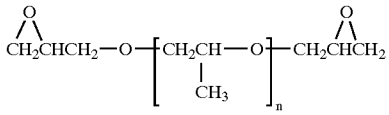

wherein n has a value such that the resulting (number average) molecular weight is 425 g/mol.

All the epoxy compounds which may be used according to the invention contain at least two epoxide groups.

Epoxy compounds which are particularly preferred are those which contain no aromatic structures. Cycloaliphatic epoxy compounds which may be employed as starting materials for cycloaliphatic epoxy resins are most particularly preferred. These provide coatings which are particularly stable to UV radiation. The production thereof is described, for example, in the Encyclopedia of Polymer Science and Engineering, Volume 6, page 336, John Wiley & Sons, and in U.S. Pat. No. 2,716,123.

Examples of suitable hardeners which may be used include anhydrides such as phthalic anhydride, tetrahydro-, hexahydro-, methyltetrahydro-, endomethylene-tetrahydro- and methylene-domethylene-tetrahydrophthalic anhydride, pyromellitic, trimellitic, benzophenone-tetracarboxylic anhydride, maleic anhydride/styrene copolymers or dodecenylsuccinic anhydride.

Suitable hardeners also include amines such as aromatic amines, cycloaliphatic amines and aliphatic amines, e.g. 4,4'-diamino-diphenylmethane and o,o'-alkyl-substituted derivatives thereof, 4,4'-diaminodiphenyl ethers, 4,4'-diaminodiphenyl sulphone, 2,4-diamino-3,5-diethyltoluene, hydrogenated 4,4'-diaminodiphenyl-methane, isophoronediamine, diethylenetriamine, triethylenetetramine, polyamino-amides based on diethylenetriamine or similar amines, and fatty acids.

The hardener and the epoxy compounds may be used as aqueous dispersions or in organic solvents, for example. The preferred organic solvents are alcohols, particularly isopropanol, ethanol, isopropyl glycol, butyl glycol, 4-hydroxy-4-methyl-2-pentanone or mixtures thereof. 4-hydroxy-4-methyl-2-pentanone is most particularly preferred.

In this respect, it has proved advantageous as regards ease of handling to use products which are already partially crosslinked. This means that the epoxy compound has already been reacted with a proportion of the hardener and the hardener has already been reacted with a proportion of the epoxy compound. Final hardening is then effected by mixing the two components at an elevated temperature.

Hardeners and partially crosslinked epoxy compounds are marketed, for example, by Ciba Spezialitätenchemie GmbH, D-79664 Wehr, Germany, under the trademark Araldite® and hardeners, as two-component system for coating very different substrates.

In addition, chain extension components (preferably phenols), polymerization initiators, polyaddition catalysts, plasticizers and impact-resistance modifiers, such as those which are known from the cited literature, may additionally be used in the primer coat (G).

Furthermore, the primer coat (G) may contain customary additives such as colorants, leveling agents, reactive thinners, inorganic or organic extenders and stabilizers, particularly UV stabilizer systems, and infrared absorbers.

In order to apply the primer coat (G) to the substrate in question, the surface of the substrate is usually cleaned first. For plastics components, it has proved useful to wash the substrate surface with ethanol or isopropanol or to clean it in warm water containing a surfactant, in an ultrasonic bath.

After blow-drying with deionized air (to prevent the electrostatic attraction of dust; see Brock, Thomas: Lehrbuch der Lacktechnologie, Vincentz Verlag, Hannover 1998), the diluted single component composition, which contains epoxy compounds and hardeners, is applied to the substrate by immersion, inundation, spraying, spin-coating or by other lacquer-coating techniques. The primer coat (G) is thus formed.

The coating thickness is controlled via the extent of dilution (preferably 2 to 35% by weight solids content) and by the coating parameters. The primer coat (G) is preferably allowed to dry at room temperature (20 to 23° C.) until it is dust-dry. Final crosslinking is subsequently effected at an elevated temperature, preferably at 90 to 130° C.

Primer coats (G) based on acrylic resins may also be used according to the invention.

Particularly suitable acrylic resin-based primer coats are described in DE 30 14 772 A1. These are formed by the application and hardening of an aqueous emulsion containing a thermosetting acrylic polymer and a hydroxyether or alkanol comprising 1 to 4 carbon atoms. Whereas the primer coats described in the above patent have to contain a UV absorber such as benzylidene malonate or cyanoacrylate, this component is in fact recommended, but is not absolutely necessary, in the acrylate-based primer coat which is used according to the present invention.

One acrylate-based primer which is preferably used according to the invention generally contains from about 1 to about 10% by weight of thermosetting acrylic solids, from about 0 to about 10% by weight of at least one compound which absorbs compound which absorbs UV light from the group comprising benzylidene malonate and cyanoacrylate, from about 20 to about 40% by weight of a hydroxyether or alkanol comprising 1 to 4 carbon atoms, and from about 40 to about 79% by weight of water. The thermosetting acrylic solids are placed in a vessel in the form of a concentrated emulsion of a thermosetting acrylic polymer. This thermosetting acrylic polymer emulsion concentrate contains a thermosetting acrylic polymer dispersed in water. The polymer is generally dispersed in water in the form of discrete spherical particles (of about 0.1 $\mu$m diameter).

Thermosetting acrylic polymers are known to those skilled in the art. Examples of thermosetting acrylic materials which may be used for carrying out the invention in practice are listed in the Encyclopedia of Polymer Science and Technology, Volume 1, Interscience Publishers, John Wiley & Sons, Inc., 1964, pages 273 et seq., in The Chemistry of Organic Film Formers, D. H. Solomon, John Wiley & Sons, Inc., 1967, pages 251 et seq., and in the literature references cited therein.

These thermosetting acrylic polymers comprise (1) acrylic copolymers which contain reactive functional groups which are capable of reacting with each other with crosslinking, (II) acrylic copolymers which contain reactive functional groups and to which a suitable, compatible, crosslinking agent is added which reacts with the functional groups with crosslinking, and (III) a mixture of two polymers which contain functional reactive groups which are capable of crosslinking.

The reactions involved in the crosslinking of thermosetting are typically those between, for example, functional epoxide groups and amino groups, epoxide groups and anhydride groups, epoxide groups and carboxyl groups, including phenolic hydroxyl groups, epoxide groups and N-methylol or N-methylol ethers, carboxyl groups and N-methylol- or N-methylol ether groups with interaction between the carboxyl and isocyanate groups; reactions between hydroxyl groups, e.g. of polyols, and isocyanate groups, and reactions between amino groups and N-methylol- or N-methylol ether groups. In the usual situation where resin mixtures are used, the acrylic fraction is the major constituent, i.e. it is present at a content of more than 50% by weight, and is typically present in an amount greater than about 70%. The requisite functional group in the acrylic polymers, which is the basis of thermosetting acrylic polymers, is introduced by using a monomer which introduces the necessary reactive functional group into the polymer chain during copolymerization. This copolymerizable monomer, which provides a functional group, is usually present in small amounts, i.e. of the order of 25% by weight or less, and is typically present in an amount between about 1 and 20% of the weight of monomer which is polymerized. Examples of monomers which introduce the requisite functional groups include glycidyl acrylate, glycidyl methacrylate, allyl glycidyl ether, dimethylaminoethyl methacrylate, vinylpyridine, tert.-butyl-aminoethyl methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate and allyl isocyanate. The other monomer, which polymerizes together with the monomers which provide the functional group, is a low molecular weight ($C_1$ to $C_2$) alkyl ester of acrylic acid or mixtures thereof, e.g. methyl acrylate, ethyl acrylate, methyl methacrylate, ethyl methacrylate or mixtures thereof, in an amount within the range between about 75 and about 99 parts, typically between about 80 and about 97 parts.

The thermosetting acrylic polymer emulsion concentrates which may generally be used for carrying out the present invention in practice are usually commercially available. In general, these emulsion concentrates contain from about 40 to about 55% solids. With regard to the composition of the primer emulsion medium, however, it has proved to be desirable for the primer emulsion medium to contain from about 1 to about 10% by weight acrylic solids. Thus it is generally necessary to dilute these commercially available emulsion media by adding additional water. Moreover, these primer emulsion media may contain hardening catalysts for the thermosetting acrylic polymers. If a catalyst such as this is present, it is contained in an amount of 0.05 to 2% by weight with respect to the weight of the acrylic solids. Examples of catalysts such as these include toluenesulphonic acid, citric acid, phosphoric acid, etc.

A second component of the primer emulsion medium is a hydroxyether or an alkanol comprising 1 to 4 carbon atoms. The hydroxyethers may be represented by the general formula

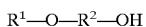

$$R^1\text{—O—}R^2\text{—OH}$$

wherein $R^1$ is an alkyl or an alkoxyalkyl radical containing from 1 to about 6 carbon atoms and R is an alkylene radical containing from 1 to about 6 carbon atoms, with the proviso that the sum of the carbon atoms in $R^1$ and $R^2$ ranges from 3 to about 10. The alkanols which contain from 1 to 4 carbon atoms comprise methanol, ethanol, propanol, isopropanol, butanol, tert.-butanol and the like.

The presence of the aforementioned hydroxyether or alkanol in amounts ranging from about 20 to about 40% by weight of the primer emulsion medium is critical for the satisfactory performance of the primer emulsion medium in order to form an effective primer coat.

Moreover, the concentration of the acrylic polymer solids in the primer emulsion medium is generally quite important. Primer emulsion media which contain from about 2 to about 6% by weight of thermosetting acrylic polymer are preferred.

Benzylidene malonate and α-cyanoacrylate may be used, amongst others, as compounds which absorb UV light.

To produce the primer coat (G), a thin coating of the primer medium is applied to the substrate by any of the well known methods, such as spraying, immersion, roller coating and the like. In general, the primer medium is applied in an amount which is sufficient to provide a hardened primer film with a thickness from about 0.254 to about 2.54 $\mu$m, preferably from about 0.51 to 2.03 $\mu$m. The bulk of the water and of the hydroxyether or alkanol is then removed by evaporation, e.g. by air drying or by gentle warming, in order to leave behind a uniform solid coating of thermosetting acrylic polymer and optionally of the compound which absorbs UV light. The thermosetting acrylic polymer is then hardened by heating the solid coating to a temperature from about 90 to about 130° C., whereby a primer coat is formed which preferably contains, in percentages by weight, from about 10 to about 90%, most preferably from about 50 to about 70%, of a thermally hardened acrylic resin and preferably from about 10 to about 90%, most preferably from about 30 to about 50%, of at least one compound which absorbs UV light.

The production of the primer coat thus involves (I) the application, to a substrate, of a primer emulsion medium which, in percentages by weight, contains (a) from about 1 to about 10% of a thermosetting acrylic polymer, (b) from 0 to about 10% of at least one compound which absorbs UV light, which is selected from the group comprising benzylidene malonate and cyanoacrylate, (c) from about 20 to about 40% of a hydroxyether or of an alkanol comprising 1 to 4 carbon atoms, and (d) from about 40 to about 79% water, (II) the evaporation of a considerable proportion of the water and hydroxyether or alkanol from the primer emulsion medium with the formation of a solid coating comprising the thermosetting acrylic polymer and optionally the compound(s) which absorbs/absorb UV light, and (III) heating the thermosetting acrylic primer coating.

Heat-absorbing Coating (W)

The heat-absorbing coating (W) may be obtained by the application and hardening of an aqueous dispersion containing an epoxy and/or acrylic resin and a polythiophene compound. Epoxy and acrylic resins which are particularly suitable include the epoxy and/or acrylic resins which may be used in the primer coating (G) and which were described above. The polythiophene compounds described above are particularly suitable as polythiophene compounds. According to one preferred embodiment of the invention, an aqueous dispersion of polyethylene dioxythiophene (PEDT) is used as the polythiophene compound; suitable polymers such as polystyrene sulphonate (PSS) may be added thereto according to need.

The coating composition for the heat-absorbing coating (W) preferably contains from 2 to 35% by weight, particularly 3 to 10% by weight, of an acrylic and/or epoxy resin, from 0.5 to 5% by weight, particularly 1 to 2% by weight, of a polythiophene compound, and from 97 to 60% by weight, particularly 96 to 70% by weight, of water.

The coating composition may be produced by the method described for the primer coat (G), wherein the polythiophene compound may be added to the other components in an arbitrary manner and sequence. The application and hardening of the heat-absorbing coating (W) may also be effected in the manner described for the primer coating (G).

The hardened heat-absorbing coating (W) generally has a coating thickness from 0.2 to 2.5 µm, preferably from 0.5 to 2.0 µm.

Scratch-resistant Coating (K)

All polymeric materials which, due to their hardness, are capable of protecting the underlying coatings from mechanical damage are suitable as a scratch-resistant coating (K). Substances which are particularly suitable for this purpose include soluble, crosslinking or thermoplastic lacquers, e.g. acrylate-, polyurethane- or polysiloxane-based lacquers, nano lacquers, and products which may be crosslinked by UV or by an electron beam.

Examples of particularly suitable scratch-resistant coatings (K) are those described in WO 99/10441 and WO 99/11725; these are scratch-resistant coatings based on silanes which contain epoxide groups.

The latter may be obtained, for instance, by the application and hardening of a coating composition containing at least one silicon compound (A) which comprises at least one radical which contains an epoxide group and which cannot be cleaved by hydrolysis, a particulate material (B) which is selected from oxides, hydrated oxides, nitrides and carbides of Si, Al and B and of transition metals and which has a particle size within the range from 1 to 100 nm, a compound (C) of Si, Ti, Zr, B, Sn or V, and at least one hydrolyzable compound (D) of Ti, Zr or Al.

The individual components of the aforementioned composition are preferably present in the following ratio:

| 1.0 mol | silicon compound (A), |
| 0.42–0.68 mol | particulate material (B), |
| 0.28–1.0 mol | compound (C), and |
| 0.23–0.68 mol | compound (D). |

Moreover, the aforementioned individual components are most preferably present in the following ratio:

| 1.0 mol | silicon compound (A), |
| 0.27–0.49 mol | particulate material (B), |
| 0.36–0.90 mol | compound (C), and |
| 0.14–0.22 mol | compound (D). |

In particular, compound (A) is a compound of general formula $R_3SiR'$, wherein the R radicals are identical or different and represent a group which may be hydrolyzed, preferably a $C_{1-4}$ alkoxy group, and R' represents a glycidyl or a glycidyloxy-$(C_{1-20})$ alkylene radical.

In particular, compound (B) is an oxide or a hydrated oxide of aluminum.

In particular, compound (C) is a compound of general formula $SiR_4$, wherein the R radicals are identical or different and represent a group which may be hydrolyzed, preferably a $C_{1-4}$ alkoxy group.

In particular, compound (D) is a compound of formula $AlR_3$, wherein the R radicals are identical or different and represent a group which may be hydrolyzed, preferably a $C_{1-6}$ alkoxy group, a $C_{1-6}$ alkoxypropanolate group or a $C_{1-6}$ alkoxyethanolate group.

With regard to the production, characterization and most preferred examples of scratch-resistant coatings based on silanes containing epoxide groups, reference is made to the detailed disclosures of WO 99/19441 and WO 99/11725.

The scratch-resistant coating (K) which is based on silanes which contain epoxides is preferably applied to an acrylic resin- or epoxy resin-based thermally insulating coating (W), or to a polythiophene intermediate coating (Z) which adheres to an acrylic resin- or epoxy resin-based primer coat (G). Optimum bonding-in of the polythiophene compound is thereby achieved. According to one particularly preferred embodiment of the invention, a scratch-resistant coating (K) which is based on silanes which contain epoxide groups is applied to an epoxy resin-based thermally insulating coating (W) described above, or is applied to a polythiophene intermediate coating (Z) which adheres to an epoxy resin-based primer coat (G).

Examples of other particularly suitable scratch-resistant coatings are the polysiloxane-based scratch-resistant coatings which are described in EP 0 350 698 A2.

The latter scratch-resistant coatings are obtained by the application and hardening of a hardenable coating composition, containing (A) a dispersion of (I) silica gel, (II) at least one alkyltrialkoxysilane, particularly a trialkoxysilane of general formula $R'Si(OR'')_3$, wherein R' is an alkyl radical containing from about 1 to 3 carbon atoms and R" is an alkyl radical containing from about 1 to 8 carbon atoms, and any reaction products of (I) and (II) in admixture with water and at least one organic solvent, and (B) an effective amount, particularly from about 0.1 to 1.0% by weight with respect to the dry weight of the coating, of a tetrabutylammonium carboxylate hardening catalyst of general formula

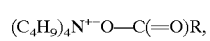

wherein R is selected from the group consisting of hydrogen, alkyl groups which contain from about 1 to 8 carbon atoms, and aromatic groups which contain from about 6 to 20 carbon atoms.

With regard to the production, characterization and to some preferred examples of polysiloxane-based scratch-resistant coatings, reference is made to the detailed disclosure of EP 0 350 698 A2.

The polysiloxane-based scratch-resistant coating (K) is preferably applied to an acrylic resin-based thermally insulating coating (W), or to a polythiophene intermediate coating (Z) which adheres to an acrylic resin-based primer coat (G). The optimum bonding-in of the polythiophene compound is thereby achieved. According to one particularly preferred embodiment of the invention, the polysiloxane-based scratch-resistant coating (K) is applied to an acrylic resin-based thermally insulating coating (W) according to DE 30 14 772 A1, or is applied to a polythiophene intermediate coating (Z) which adheres to an acrylic resin-based primer coat (G) according to DE 30 14 772 A1.

The scratch-resistant coatings (K) may also contain customary additives, such as colorants, leveling agents, UV stabilizers, photo-initiators, photo-sensitizers (if it is intended to harden the composition photochemically) and thermal polymerization catalysts.

The scratch-resistant coating (K) preferably contains one or more UV absorbers, in order to protect the polythiophene compound contained in the underlying coating from decomposition by UV radiation.

Application to the substrate is effected by standard methods of coating, such as immersion, painting, brushing, application by doctor blade, rolling, spraying, falling film application, spin coating and centrifugal application.

The coated substrate is hardened, optionally after a prior preliminary drying step at room temperature. Hardening is preferably effected thermally at temperatures within the range from 50 to 300° C., particularly from 70 to 200° C. and most preferably from 90 to 180° C., optionally under reduced pressure. Under these conditions the time of hardening is preferably less than 200 minutes, more preferably less than 100 minutes and most preferably less than 60 minutes. The coating thickness of the hardened coating preferably ranges from 0.5 to 100 $\mu$m, more preferably from 1 to 20 $\mu$m and most preferably from 2 to 10 $\mu$m.

If unsaturated compounds and photo-initiators are present, hardening may also be effected by irradiation, optionally followed by thermal post-hardening.

The invention is described in greater detail below with reference to examples thereof.

EXAMPLES

Polymeric Base Material (B)

Panels of bisphenol A homopolycarbonate (Tg=147° C., MW=27,500 g/mol; Makrolon® 2808 supplied by Bayer AG) of dimensions 105×150×4 mm were used as polymeric base material (B).

Polythiophene Compound

A 1.3% aqueous dispersion of polyethylene dioxythiophene (PEDT) and polystyrene sulphonate (PSS) (pH=1 to 2), which is obtainable from Bayer AG under the trademark Baytron®-P was used as the IR-absorbing polythiophene compound.

Heat-absorbing Intermediate Coating (Z)

The IR-absorbing intermediate coating (Z) was applied to the primer coat (G) by the application and drying of a 1.3% aqueous dispersion of polyethylene dioxythiophene (PEDT) and polystyrene sulphonate (PSS) (pH=1 to 2). The coating thickness of the heat-absorbing intermediate coating (Z) after drying was 80 nm.

Priming Lacquer for the Production of the Primer Coat (G)

Priming Lacquer G1

(a) 32 parts by weight of an oligomeric bisphenol A-diglycidyl ether of the following formula (b) 7 parts by weight ethoxylated tetraethylenepentamine
HO CH$_2$ CH$_2$—NH—(CH$_2$—CH$_2$—NH)$_3$—CH$_2$—H$_2$—NH—CH$_2$ CH$_2$—OH (c) 3 parts by weight
pentamethyleneimine (d) 252 parts by weight
4-hydroxy4-methyl-2-pentanone (e) 1000 parts by weight water (f) 6 parts by weight of a leveling agent and emulsifying agent.

In order to produce priming lacquer G1, the solvent, namely 4-hydroxy-4-methyl-2-pentanone, water and emulsifying agent were placed in a vessel at room temperature and the other additives were added in an arbitrary sequence with stirring. The batch was stirred until a clear, homogeneous dispersion was obtained. The dispersion was stored at room temperature.

Priming Lacquer G2

3 g diethyl-p-methoxybenzylidene malonate were dissolved in 32 g butoxyethanol. 56.5 g water were added to this solution, and the batch was mixed with 8.5 g of a commercially available, thermosetting acrylic resin emulsion (Rhoplex® AC-658), and was stirred to form an emulsion.

Heat-absorbing Coating (W)

Heat-absorbing coating (W1) was produced by the application and hardening of a coating composition which in addition to the aforementioned constituents of priming lacquer G1 contained 1.0 parts by weight of Baytron®-P as an IR-absorbing polythiophene compound in the solid film.

Heat-absorbing coating (W2) was produced by the application and hardening of a coating composition which in addition to the aforementioned constituents of priming lacquer G2 contained 1.0 parts by weight of Baytron®-P as an IR-absorbing polythiophene compound in the solid film.

Primer coats (G) and heat-absorbing coatings (W) were formed by inundation, to give a coating thickness of 0.8 $\mu$m.

Scratch-resistant Coating (K)

Scratch-resistant Coating K1

354.5 g (3.0 mol) n-butoxyethanol were added drop-wise to 246.3 g (1.0 mol) aluminum tri-sec-butanolate with stirring, whereupon the temperature rose to about 45° C. After cooling, it was necessary to store the aluminate solution under sealed conditions.

1239 g 0.1N HCl were placed in a vessel. 123.9 g (1.92 mol) of Boehmite Disperal Sol P3® were added thereto.

Thereafter, the batch was stirred for one hour at room temperature. The solution was filtered through a deep-bed filter to remove solid impurities.

787.8 g (3.33 mol) GPTS (γ-glycidyloxypropyltrimethoxysilane) and 608.3 g TEOS (tetraethoxysilane) (2.92 mol) were mixed and stirred for 10 minutes. 214.6 g of the boehmite sol were added to this mixture over about two minutes. A few minutes after the addition, the temperature of the sol rose to about 28 to 30° C. and the sol became clear after about 20 minutes. The mixture was subsequently stirred for about two hours at 35° C. and was then cooled to about 0° C.

600.8 g of a solution of Al(OEtOBu)$_3$ in sec.-butanol, prepared as described above and containing 1.0 mol Al (OEtOBu)3, were then added at 0° C.±2° C. After the addition was complete, the batch was stirred for a further two hours at about 0° C. and then the remaining boehmite sol was likewise added at 0° C.±2° C. This was followed by allowing the reaction mixture obtained to warm to room temperature over about three hours, without the application of heat Byk 306® was added as a leveling agent. The mixture was filtered and the lacquer obtained was stored at +4° C.

Scratch-resistant Coating K2

203 g methyltrimethoxysilane were mixed with 1.25 g glacial acetic acid. 125.5 g Ludox® AS (an ammonium-stabilized colloidal silica sol, 40% SiO$_2$, with a silica particle diameter of about 22 μm and a pH of 9.2) were diluted with 41.5 g of deionized water in order to obtain a SiO$_2$ content of 30% by weight. This material was added to the acidified methyltrimethoxysilane with stirring. The solution was stirred for a further 16 to 18 hours at room temperature and a solvent mixture comprising isopropanol/n-butanol in a ratio by weight of 1:1 was subsequently added. Finally, 32 g of the UV absorber 4-[γ-(tri-(methoxy/ethoxy)silyl)propoxy]-2-hydroxybenzophenone were added. The mixture was stirred for two weeks at room temperature. The composition had a solids content of 20% by weight and contained 11% by weight of the UV absorber with respect to the solids constituents. The coating composition had a viscosity of about 5 cSt at room temperature.

What is claimed is:

1. A transparent molding comprising a substrate of polymeric material, a primer coat that contains at least one member selected from the group consisting of epoxy and acrylic resin, said primer coat disposed on at least one surface of said substrate, and a heat absorbing coating that contains a polythiophene compound disposed on the surface of said primer coat compound, and a scratch-resistant coating disposed over the said heat absorbing coating wherein one of said primer coat and heat-absorbing coating contains a hardened epoxy resin prepared from a hardener and a multi-epoxyfunctional compound, wherein the hardener is at least one member selected from the group consisting of amine and anhydride and wherein the multi-epoxyfunctional compound is at least one member selected from the group consisting of aromatic glycidyl compound, cycloaliphatic glycidyl compound, heterocyclic glycidyl compound, cycloaliphatic epoxy compound and aliphatic epoxy compound.

2. A transparent molding comprising a substrate of polymeric material, a heat-absorbing coating prepared by the hardening of an aqueous dispersion that contains a polythiophene compound and at least one member selected from the group consisting of epoxy and acrylic resin said heat absorbing coating being disposed on at least one surface of said substrate, and a scratch-resistant coating disposed over said heat absorbing coating.

3. The molding according to claim 1 wherein the polymeric material is multi-layered.

4. The molding according to claim 2 wherein the polymeric material is multi-layered.

5. The molding according to claim 1 wherein the substrate is a double layer body prepared by coextrusion.

6. The molding according to claim 2 wherein the substrate is a double layer body prepared by coextrusion.

7. The molding according to claim 1 wherein the polymeric material contains at least one member selected from the group consisting of polycarbonate, polyester carbonate and poly(meth)acrylate.

8. The molding according to claim 2 wherein the polymeric material contains at least one member selected from the group consisting of polycarbonate, polyester carbonate and poly(meth)acrylate.

| Test | Primer coat (G) | Heat-absorbing intermediate coating (Z) | Heat-absorbing coating (W) | Scratch-resistant coating (K) | % T | TSET |
|---|---|---|---|---|---|---|
| 1 (comp.) | G1 | – | – | K1 | 91 | 87 |
| 2 | G1 | + | – | K1 | 72 | 58 |
| 3 | — | – | + | K1 | 76 | 64 |
| 4 (comp.) | G2 | – | – | K2 | 93 | 88 |
| 5 | — | – | + | K2 | 77 | 64 |
| 6 (comp.) | — | – | – | — | 90 | 87 |
| 7 (comp.) | — | + | – | — | 88 | 85 |
| 8 (comp.) | tinted window glass (without any coating) | | | | 77 | 54 |

+ = coating present
– = no coating present

Moldings 2, 3 and 5 according to the invention were distinguished by a very uniform distribution of the polythiophene compound on the surface of the respective substrate, outstanding adhesion between the individual coatings, and by excellent TSET values ranging from 58 to 64.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

9. The molding according to claim 1 wherein the polythiophene compound is a member selected from the group consisting of a compound conforming to formula (I)

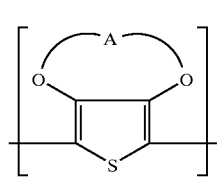

(I)

wherein A represents a $C_1$ to $C_4$ alkylene radical, which is optionally substituted, and a soluble salt of polythiophene, that contains structural units of formula

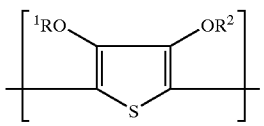
(II)

wherein R' and $R^2$, independently of each other, denote hydrogen or a $C_1$ to $C_4$ alkyl group and together form a $C_1$ to $C_4$ alkylene radical which is optionally substituted.

10. The molding according to claim 2 wherein the polythiophene compound is a member selected from the group consisting of a compound conforming to formula (I)

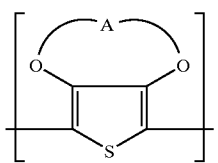
(I)

wherein A represents a $C_1$ to $C_4$ alkylene radical, which is optionally substituted, and a soluble salt of polythiophene, that contains structural units of formula

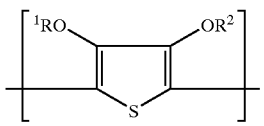
(II)

wherein R' and $R^2$, independently of each other, denote hydrogen or a $C_1$ to $C_4$ alkyl group and together form a $C_1$ to $C_4$ alkylene radical which is optionally substituted.

11. The molding according to claim 1 wherein the polythiophene compound is polyethylene dioxythiophene.

12. The molding according to claim 2 wherein the polythiophene compound is polyethylene dioxythiophene.

13. The molding according to claim 1 wherein the heat-absorbing coating is formed by the application and hardening of an aqueous emulsion of polyethylene dioxythiophene and polystyrene sulphonate.

14. The molding according to claim 2 wherein the heat-absorbing coating is formed by the application and hardening of an aqueous emulsion of polyethylene dioxythiophene and polystyrene sulphonate.

15. The molding according to claim 1 wherein the heat-absorbing coating has thickness of about 0.01 to 1.5 μm.

16. The molding according to claim 2 wherein the heat-absorbing coating has thickness of about 0.01 to 1.5 μm.

17. The molding according to claim 1 wherein the multi-epoxyfunctional compound is a cycloaliphatic epoxy compound.

18. The molding according to claim 1 wherein the hardener is a member selected from the group consisting of amine and anhydride and wherein the multi-epoxyfunctional compound is selected from the group consisting of bisphenol A-diglycidyl ethers of the following formula

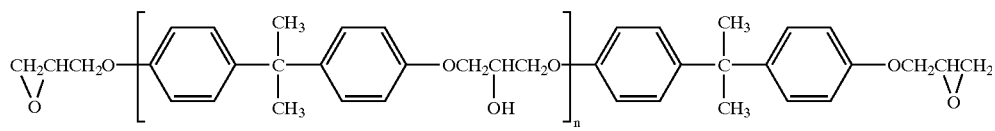

wherein n=0 to 30, a 3,4-epoxycyclohexanecarboxylic acid-3,4'-epoxycyclohexylmethyl ester of the following formula

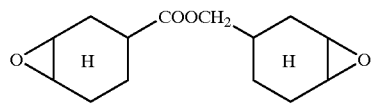

a bis-(3,4-epoxycyclohexylmethyl) adipate of the following formula

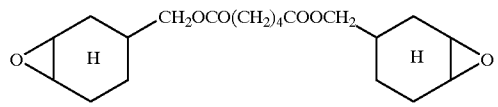

a 3-(3,4'-epoxycyclohexyl-2,4-dioxa-spiro[5.5]-8,9-epoxyundecane of the following formula

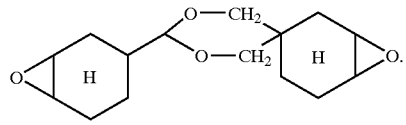

19. The molding according to claim 1 wherein the primer coat or the heat-absorbing coating is formed by the application and hardening of an aqueous emulsion which contains acrylic polymers and a hydroxyether or an alkanol comprising 1 to 4 carbon atoms.

20. The molding according to claim 1 wherein the primer coat or the heat-absorbing coating have a thickness of 0.2 to 2.5 μm.

21. The molding according to claim 1 wherein the scratch-resistant coating is formed by the application and hardening of a coating composition comprising at least one silane which contains epoxide groups.

22. The molding according to claim 1 wherein the scratch resistant coating contains at least one silicon compound having at least one radical which contains an epoxide group, which silicon compound is directly bonded to Si and which cannot be cleaved by hydrolysis, and particulate material selected from oxide, hydrated oxide, nitride and carbide of Si, Al and B and of transition metals and which has a particle size within the range from 1 to 100 nm, and a compound of Si, Ti, Zr, B, Sn or V, and at least one hydrolyzable compound of Ti, Zr or Al.

23. The molding according to claim 1 wherein the scratch-resistant coating is formed by the application and hardening of a coating composition which consists at least of an alkyl alkoxysilane and colloidal silica sol in a mixture of water and at least one organic solvent.

24. The molding according to claim 1 wherein the scratch-resistant coating has a thickness of 0.01 to 20 $\mu$m.

25. The molding according to claim 1 wherein the scratch-resistant coating contains a UV absorber.

* * * * *